(12) United States Patent
Fehrmann et al.

(10) Patent No.: US 10,130,911 B2
(45) Date of Patent: Nov. 20, 2018

(54) CO₂ SORPTION BY SUPPORTED AMINO ACID IONIC LIQUIDS

(71) Applicant: Danmarks Tekniske Universitet, Kgs. Lyngby (DK)

(72) Inventors: Rasmus Fehrmann, Copenhagen (DK); Anders Riisager, Taastrup (DK); Helene Kolding, Kgs. Lyngby (DK); Saravanamurugan Shunmugavel, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 15/428,017

(22) Filed: Feb. 8, 2017

(65) Prior Publication Data

US 2017/0173523 A1    Jun. 22, 2017

Related U.S. Application Data

(62) Division of application No. 14/414,425, filed as application No. PCT/EP2013/064802 on Jul. 12, 2013, now abandoned.

(Continued)

(30) Foreign Application Priority Data

Jul. 13, 2012    (EP) ..................... 12176318

(51) Int. Cl.
| | | |
|---|---|---|
| *B01D 53/62* | (2006.01) | |
| *B01D 53/80* | (2006.01) | |
| *B01D 53/81* | (2006.01) | |
| *B01D 53/82* | (2006.01) | |
| *B01D 53/83* | (2006.01) | |
| *B01D 53/96* | (2006.01) | |
| *B01J 31/02* | (2006.01) | |
| *B01J 20/02* | (2006.01) | |
| *B01J 20/04* | (2006.01) | |

(Continued)

(52) U.S. Cl.
CPC ......... *B01D 53/62* (2013.01); *B01D 53/1475* (2013.01); *B01D 53/1493* (2013.01); *B01D 2252/30* (2013.01)

(58) Field of Classification Search
None
See application file for complete search history.

(56) References Cited

U.S. PATENT DOCUMENTS

| 4,761,164 A | 8/1988 | Pez et al. |
|---|---|---|
| 5,336,298 A | 8/1994 | Quinn et al. |
| 2005/0129598 A1 | 6/2005 | Chinn et al. |

FOREIGN PATENT DOCUMENTS

| CN | 101468308 A | 7/2009 |
|---|---|---|
| CN | 101749722 A | 6/2010 |

(Continued)

OTHER PUBLICATIONS

Aki et al., "High-Pressure Phase Behavior of Carbon Dioxide with Imidazolium-Based Ionic Liquids", J. Phys. Chem. B, vol. 108, No. 52, 2004, pp. 20355-20365.

(Continued)

*Primary Examiner* — Daniel Berns
(74) *Attorney, Agent, or Firm* — Morrison & Foerster LLP (57) ABSTRACT

The present invention concerns the absorption and desorption behavior of carbon dioxide ($CO_2$) using ionic liquids derived from amino acids adsorbed on porous carrier materials.

14 Claims, 9 Drawing Sheets

Table 2

| ionic liquid[b] | SILP loading (wt.%) | Abs. Capacity[a] | |
|---|---|---|---|
| | | Mol CO₂/mol IL | Wt.% CO₂ |
| [N₆₆₆₆][Ile] | 40 | 1.21 | 4.4 |
| [N₆₆₆₆][Gly] | 40 | 1.11 | 4.5 |
| [N₆₆₆₆][Asn] | 40 | 0.94 | 3.4 |
| [N₆₆₆₆][Tyr] | 40 | 1.13 | 3.7 |
| [N₆₆₆₆][Pro] | 10 | 1.74 | 1.6 |
| [N₆₆₆₆][Pro] | 30 | 1.34 | 3.8 |
| [N₆₆₆₆][Pro] | 40 | 1.23 | 4.6 | a) 25°C, 1 bar CO₂; b) [N6666]: tetrahexylammonium, [Ile]: L-Isoleucinate, [Gly]: Glycinate, [Asn]: L-Asparaginate, [Tyr]: L-Tyrosinate, [Pro]: L-Prolinate.

Related U.S. Application Data (60) Provisional application No. 61/671,569, filed on Jul. 13, 2012.

(51) Int. Cl.

| | |
|---|---|
| *B01J 20/08* | (2006.01) |
| *B01J 20/10* | (2006.01) |
| *B01J 20/16* | (2006.01) |
| *B01J 20/18* | (2006.01) |
| *B01J 20/22* | (2006.01) |
| *B01J 20/32* | (2006.01) |
| *B01J 20/34* | (2006.01) |
| *B01D 53/14* | (2006.01) |

(56) References Cited

FOREIGN PATENT DOCUMENTS

| | | |
|---|---|---|
| CN | 101822932 A | 9/2010 |
| CN | 102489117 A | 6/2012 |
| JP | 2010-214324 A | 9/2010 |

OTHER PUBLICATIONS

Bates et al., "$CO_2$ Capture by a Task-Specific Ionic Liquid", Journal American Chemical Society, vol. 124, No. 6, 2002, pp. 926-927.

Blanchard et al., "High-Pressure Phase Behavior of Ionic Liquid/$CO_2$ Systems", J. Phys. Chem. B, vol. 105, No. 12, 2001, pp. 2437-2444.

Database WPI, "Week 201069", Thomson Scientific. London. GB, AN 2010- M50066, retrieved on Nov. 28, 2012, XP002687712, 2010, 5 pages.

Gottfried et al., "Surface Studies on the Ionic Liquid 1-Ethyl-3-Methylimidazolium Ethylsulfate using X-Ray Photoelectron Spectroscopy (XPS)", Zeitschrift für Physikalische Chemie, vol. 220, No. 10, Oct. 2006, pp. 1439-1453.

Gu et al., "Volume Expansivities and Isothermal Compressibilities of Imidazolium and Pyridinium-Based Ionic Liquids", Journal of Chemical Engineering Data, vol. 47, No. 2, 2002, pp. 339-345.

Gurau et al., "Demonstration of Chemisorption of Carbon Dioxide in 1,3-Dialkylimidazolium Acetate Ionic Liquids", Angewandte Chemie International Edition, vol. 50, 2011, pp. 12024-12026.

Gurkan et al., "Equimolar $CO_2$ Absorption by Anion-Functionalized Ionic Liquids", Journal American Chemical Society, vol. 132, No. 7, 2010, pp. 2116-2117.

Huang et al., "Why are Ionic Liquids Attractive for $CO_2$ Absorption? An Overview", Australian Journal of Chemistry, vol. 62, 2009, pp. 298-308.

Huang et al., "Why is the Partial Molar Volume of $CO_2$ So Small When Dissolved in a Room Temperature Ionic Liquid? Structure and Dynamics of $CO_2$ Dissolved in [Bmim+] [PF6−]", Journal American Chemical Society, vol. 127, No. 50, 2005, pp. 17842-17851.

International Preliminary Report on Patentability received for PCT Patent Application No. PCT/EP2013/064802, completed on Nov. 10, 2014, 15 pages.

International Search Report and Written Opinion received for PCT Patent Application No. PCT/EP2013/064802, dated Sep. 5, 2013, 10 pages.

Jacquemin et al., "High-Pressure Volumetric Properties of Imidazolium-Based Ionic Liquids: Effect of the Anion", Journal of Chemical and Engineering Data, vol. 52, No. 6, 2007, pp. 2204-2211.

Jiang et al., "Electronic Supplementary Information: Tetraalkylammonium Amino Acids as Functionalized Ionic Liquids of Low Viscosity", Supplementary Material (ESI) for Chemical Communications, 2007, pp. 1-3.

Jiang et al., "Tetraalkylammonium Amino Acids as Functionalized Ionic Liquids of Low Viscosity", Chemical Communications, 2008, pp. 505-507.

Jutz et al., "Ionic Liquids and Dense Carbon Dioxide: A Beneficial Biphasic System for Catalysis", Chemical Reviews, vol. 111, No. 2, 2011, pp. 322-353.

Kolding et al., "$CO_2$ Capture Technologies: Current Status and New Directions Using Supported Ionic Liquid Phase (SILP) Absorbers", Science China Chemistry, vol. 55, No. 8, Aug. 2012, pp. 1648-1656.

Maginn, Edward J., "Design and Evaluation of Ionic Liquids as Novel $CO_2$ Absorbents", Quarterly Technical Report, DOE Award No. DE-FG26-04NT42122, University of Notre Dame, May 31, 2005, pp. 1-12.

Non-Final Office Action received for U.S. Appl. No. 14/414,425, dated Aug. 10, 2016, 12 pages.

Sánchez et al., "Solvent Properties of Functionalized Ionic Liquids for $CO_2$ Absorption", Chemical Engineering Research and Design, vol. 85 (A1), Jan. 2007, pp. 31-39.

Soutullo et al., "Reversible $CO_2$ Capture by Unexpected Plastic-, Resin-, and Gel-like Ionic Soft Materials Discovered during the Combi-Click Generation of a TSIL Library", Chemistry of Materials, vol. 19, No. 15, Jul. 24, 2007, pp. 3581-3583.

Steinrück, Hans-Peter, "Recent Developments in the Study of Ionic Liquid Interfaces Using X-Ray Photoelectron Spectroscopy and Potential Future Directions", Phys. Chem. Chem. Phys., vol. 14, 2012, pp. 5010-5029.

Zhang et al., "Supported Absorption of $CO_2$ by Tetrabutylphosphonium Amino Acid Ionic Liquids", Chemistry European Journal, vol. 12, 2006, pp. 4021-4026.

FIG. 1

Table 1

| Entry | Ionic liquid | Structure | Abs. Capacity[a] |
|---|---|---|---|
| 1 | [N$_{4444}$][Met] | [(C$_4$H$_9$)$_4$N]$^+$ [Met]$^-$ | 0.95 |
| 2 | [N$_{6666}$][Ile] | [(C$_6$H$_{13}$)$_4$N]$^+$ [Ile]$^-$ | 1.21 |
| 3 | [N$_{6666}$][Gly] | [(C$_6$H$_{13}$)$_4$N]$^+$ [Gly]$^-$ | 1.11 |
| 4 | [N$_{6666}$][Asn] | [(C$_6$H$_{13}$)$_4$N]$^+$ [Asn]$^-$ | 0.94 |
| 5 | [N$_{6666}$][Pro] | [(C$_6$H$_{13}$)$_4$N]$^+$ [Pro]$^-$ | 1.13 |
| 6 | [N$_{6666}$][Tyr] | [(C$_6$H$_{13}$)$_4$N]$^+$ [Tyr]$^-$ | 1.13 |

[a] mol $CO_2$/mol IL. Corrected for uptake by $SiO_2$

25°C, 1 bar $CO_2$; SILP loading 40 wt.%

FIG. 2

Table 2

| Ionic liquid[b] | SILP loading (wt.%) | Abs. Capacity[a] | |
|---|---|---|---|
| | | Mol $CO_2$/mol IL | Wt.% $CO_2$ |
| [$N_{6666}$][Ile] | 40 | 1.21 | 4.4 |
| [$N_{6666}$][Gly] | 40 | 1.11 | 4.5 |
| [$N_{6666}$][Asn] | 40 | 0.94 | 3.4 |
| [$N_{6666}$][Tyr] | 40 | 1.13 | 3.7 |
| [$N_{6666}$][Pro] | 10 | 1.74 | 1.6 |
| [$N_{6666}$][Pro] | 30 | 1.34 | 3.8 |
| [$N_{6666}$][Pro] | 40 | 1.23 | 4.6 | a) 25°C, 1 bar $CO_2$; b) [N6666]: tetrahexylammonium, [Ile]: L-Isoleucinate, [Gly]: Glycinate, [Asn]: L-Asparaginate, [Tyr]: L-Tyrosinate, [Pro]: L-Prolinate.

FIG. 3A

Table 3

| Entry | Ionic liquid | SILP loading (% w/w) | Abs. Capacity[a] |
|---|---|---|---|
| 7 | [N6666][Pro] | 10.2 | 1.74 |
| 8 | [N6666][Pro] | 30.5 | 1.34 |
| 9 | [N6666][Pro] | 40.0 | 1.23 |

[a] mol $CO_2$/mol IL. Corrected for uptake by $SiO_2$
25°C, 1 bar $CO_2$;

FIG. 3B

Table 4

| Cycle | Conditions | Abs. stoich. | Corr. abs. stoich. |
|---|---|---|---|
| 1 | $CO_2$, rt, 3d | 1.51 | 1.23 |
|   | Ar, 80°C, 3h | 0.00 | -0.28 |
| 2 | $CO_2$, rt, 1d | 1.32 | 1.05 |
|   | Ar, 80°C, 2h | -0.46 | -0.74 |
| 3 | $CO_2$, rt, 2d | 1.45 | 1.17 |
|   | Ar, 80°C, 24h | -0.49 | -0.77 |

Uptake of moles of $CO_2$ per mole of IL by [N6666][Pro] during recycling.

FIG. 3C    Table 5

| Ionic liquid | Cycle 1[a] | Cycle 2[a] | Cycle 3[a] | Cycle 4[a] |
|---|---|---|---|---|
| [N6666] [Gly] SILP loading 40% | 1.01 | 0.98 | 0.96 | 0.95 |

[a] The absorption capacity is measured as mol $CO_2$/mol IL, the absorption takes place at 25°C.

CO$_2$ SORPTION BY SUPPORTED AMINO ACID IONIC LIQUIDS

CROSS REFERENCE TO RELATED APPLICATIONS

This application is a divisional of U.S. National Phase application Ser. No. 14/414,425, with an international filing date of Jul. 12, 2013, which claims priority to International Patent Application No. PCT/EP2013/064802, filed Jul. 12, 2013, which claims priority to U.S. Provisional Patent Application No. 61/671,569, filed Jul. 13, 2012, and EP Patent Application No. 12176318.9, filed Jul. 13, 2012, each of which is hereby incorporated by reference in the present disclosure in its entirety.

FIELD OF THE INVENTION

The present invention concerns the absorption and desorption behaviour of carbon dioxide (CO$_2$) using ionic liquids derived from certain amino acids, adsorbed on porous carrier materials.

BACKGROUND OF THE INVENTION

Carbon dioxide is recognized as a greenhouse gas that contributes to climate changes. A major cause of CO$_2$ emission is from combustion of fossil fuels like oil and coal in production of electricity and heat. The world consumption of coal is expected to increase by 49% in 2030 and accordingly much attention has been focused on reducing CO$_2$ emission from power plant flue-gas streams. Currently, aqueous solutions of organic amines are being used to capture CO$_2$ in scrubbers as carbamates despite concerns about, e.g. low absorbent capacity and energy intensive regeneration by desorption, which may require up to one-third of the total energy output from the power plant. Other technical challenges with amine sorbents include corrosion of steel pipes and pumps as well as thermal and chemical decomposition. In addition concern has been expressed about emission of the amines to the atmosphere leading to serious human health hazards. Solid absorbers also work unsatisfactorily among others due to the high desorption energy required to desorb CO$_2$ and regenerate the absorber.

In order to overcome these inherent problems, it is highly desired to develop a viable and energy-efficient technology for CO$_2$ capture by use of alternative, suitable absorbents.

Ionic liquids (ILs) are promising candidates as absorbents in CO$_2$ removal due to their relatively high thermal stability, exceptionally low vapour pressure and tunable physico-chemical properties [see eg. a) F. Jutz et al. Chem. Rev. 2011, 111, 322; b) J. Huang et al. Aust. J. Chem. 2009, 62, 298]. There have been many reports on CO$_2$ capture using common ILs (typically referred to as first-generation ionic liquids), and a maximum CO$_2$ absorption capacity of 0.75 in mole fraction of CO$_2$ has been found for [C$_8$MIM][PF$_6$] at 40° C. under 93 bar pressure [see eg. a) L. A. Blanchard, Z. Gu, Joan F. Brennecke, J. Phys. Chem. B 2001, 105, 2437; b) Z. Gu, Joan F. Brennecke, J. Chem. Eng. Data 2002, 47, 339; c) Sudhir N. V. K. Aki, Berlyn R. Mellein, Eric M. Saurer, Joan F. Brennecke, J. Phys. Chem. B 2004, 108, 20355]. The CO$_2$ absorption capacity of these kinds of ILs is, however, limited due to the relatively weak physisorption taking place between the IL and CO$_2$. To circumvent this drawback, Davis and co-workers developed task-specific ionic liquids (TSILs) which are able to chemically bind CO$_2$ to amine-functionalised imidazolium-based IL at ambient conditions. Even though these TSILs form a chemical bond with CO$_2$ the absorption capacity was only 0.5 mol of CO$_2$ per mol of IL (mole ratio of 0.33) due to intermolecular carbamate formation (1:2 mechanism), [see Eleanor D. Bates et al., J. Am. Chem. Soc. 2002, 124, 926]. Zhang et al. have proposed a new mechanism for the formation of carbamic acid after CO$_2$ absorption in phosphonium-based amino acid functionalised ILs [J. Zhang, S. Zhang, K. Dong, Y. Zhang, Y. Shen, X. Lv. Chem. Eur. J. 2006, 12, 4021]. In this mechanism, one mol of CO$_2$ also reacted with two moles of IL, however in presence of water (1 wt. %) the IL could absorb an equimolar amount of CO$_2$ via a bicarbonate mechanism (mole ratio of 0.5). Recently, the formation of carbamic acid in amino acid-based ILs was further confirmed by Brennecke and co-workers by examining proline and methionine functionalised phosphonium-based ILs for CO$_2$ absorption. Here it was shown that one mol of IL can absorb one mol of CO$_2$ (1:1 mechanism) [see B. E. Gurkan, J. C. de la Fuente, E. M. Mindrup, L. E. Ficke, B. F. Goodrich, E. A. Price, W. F. Schneider, J. F. Brennecke, J. Am. Chem. Soc. 2010, 132, 2116]. A few other reports have also published equimolar amount of CO$_2$ absorption in functionalised ILs, but the typical CO$_2$-absorption capacity for published IL based solutions is sub-stoichiometric rather than super-stoichiometric.

Chemical absorption (chemisorption) of CO$_2$ was first observed in imidazolium acetates, where the CO$_2$ can be trapped either as bicarbonate or, as recently found, also as a carboxylate on carbon position 2 of the imidazole via a carbene mechanism [U.S. patent application Ser. No. 10/737,090; U.S. Pat. No. 5,336,298; Maginn, E., DOE Report, quarterly, Jan. 5-Mar. 5, 2005, 1-12, DOE Scientific and Technical Information, Oak Ridge, Tenn.]. This was recently proven by Rogers and co-workers upon determination of its crystal structure [Gurau G et al. Angew Chem Int Ed, 2011, 50:12024-12026]. However, amine functionalized ILs have proven to have a higher CO$_2$ uptake stoichiometry and has attracted more attention. If an amine functionality is linked to the cation, intermolecular carbamate formation takes place resulting in a maximum stoichiometry of 0.5 moles of CO$_2$ per mol of IL [$^a$Galan Sanchez L et al., Solvent properties of functionalized ionic liquids for CO$_2$ absorption. Chem Engineer Res Design, 2007, 85: 31-39; $^b$Soutullo M et al. Reversible CO$_2$ capture by unexpected plastic-, resin-, and gel-like ionic soft materials was discovered during the combi-click generation of a TSIL library. Chem Mater, 2007, 19: 3581-3583]. This has been demonstrated for imidazolium-based cations, where the amine is introduced on one of the alkyl chains. A major drawback of this method is that the already high viscosity of the IL becomes much higher when attaching another functional group to the IL. The important point is, however, that these compounds show much higher CO$_2$ uptake than their non-functionalized counterparts.

If the amine functionality is attached to the anion of the IL, carbamate species also form, but there is a possibility that the negatively charged functionality on the anion can take up the proton released upon CO$_2$ capture forming carbamic acid. Then CO$_2$ can be absorbed with a stoichiometry of up to 1:1, meaning much more efficient use of the IL. However, in most cases, the absorption capacity still corresponds to 0.5:1. This could very well be related to residual water in the IL interfering with the released proton, preventing it from protonating the anionic part.

Therefore it must be concluded that despite growing demand, there has not yet been suggested a satisfactory and economically feasible technical solution to the problem of removing $CO_2$ from eg. flue gases which has a high sorption efficiency, a high capacity and a sufficient robustness to allow for uninterrupted performance over long time periods.

SUMMARY OF THE INVENTION

It has surprisingly been found that compositions comprising ionic liquids (ILs) based on simple tetraalkylammonium salts of certain amino acids adsorbed on porous (including mesoporous) materials are excellent absorbers of $CO_2$ having high sorption efficiencies. Thus, absorption of stoichiometric amounts of $CO_2$ at ambient temperature and pressure (ie. 1 mol $CO_2$ per mol IL), and in some cases even super-stoichiometric absorption was observed (i.e. more than 1 mol $CO_2$ per mol IL).

In a first aspect the present invention therefore provides a composition for absorption/desorption of gaseous carbon dioxide ($CO_2$), which comprises an ionic compound $[A^+]$ $[B^-]$ and a porous material, wherein

$[A^+]$ is an ammonium ion of Formula I

Formula I wherein $R_1$, $R_2$, $R_3$ and $R_4$ are individually selected from linear or branched $C_n$ alkyl chains where n is an integer having a value of at least 4 and not more than 30, and wherein $[B^-]$ is an anion of Formula II:

Formula II wherein $R_5$ is selected from hydrogen or a $C_1$-$C_6$ linear or branched alkyl group, and G can be hydrogen or a group of Formula III:

Formula III wherein
$R_6$ is selected from hydrogen or a $C_1$-$C_6$ linear or branched alkyl group;
$R_7$ can be a $C_1$-$C_6$ linear or branched alkyl group or an aromatic group, and
when $R_5$ is hydrogen, $R_7$ may further also be attached to the nitrogen atom to which $R_5$ is attached, thereby forming a 4-7 membered ring together with said nitrogen.

In a second aspect the invention provides a method for absorption of gaseous $CO_2$ from a gas stream, which method comprises contacting said gas stream with a composition according to the first aspect of the invention.

Reversible $CO_2$ absorption/desorption was further demonstrated at 80° C. without degradation of the supported ionic compound (also referred to in the following as the supported ionic liquid phase (SILP) material), and consecutive absorption-desorption cycles (desorption done at 80° C. for 2 h under argon flow) demonstrated complete desorption between each sorption cycle along with preservation of absorption capacities of above 1 mol $CO_2$/mol IL for the second and third cycle, respectively.

In a third aspect the invention therefore also allows for desorption of the absorbed $CO_2$ by increasing the temperature of the composition and/or decreasing the total pressure surrounding it and/or by flushing it with a gas stream with no or lower $CO_2$ content than the gas stream originally applied for the absorption.

FIGURES AND TABLES

FIGS. 3A-C show absorption capacities for different $[N_{6666}]$ materials.

FIGS. 10A-B show recycling curves for [N6666][Gly].

DETAILED DESCRIPTION OF THE INVENTION

The inventors have found that compositions comprising ionic liquids (ILs) based on simple tetraalkylammonium salts of certain amino acids adsorbed on high area, porous (including mesoporous) inert materials are excellent absorbers of $CO_2$ having high sorption efficiencies. Thus, adsorption of stoichiometric amounts of $CO_2$ at ambient temperature and pressure (ie. 1 mol $CO_2$ per mol IL), and in some cases even super-stoichiometric absorption was observed (ie. more than 1 mol $CO_2$ per mol IL). All superstoichiometric uptake amounts must be explained by physical absorption (physisorption) as the ILs of the present invention are only able to bind at most one mol $CO_2$ by a chemical reaction with the amino group.

In a first aspect the present invention therefore provides a composition for absorption/desorption of gaseous carbon dioxide ($CO_2$), which comprises an ionic compound $[A^+]$ $[B^-]$ and a porous material, wherein

[A⁺] is an ammonium ion of Formula I

Formula I wherein $R_1$, $R_2$, $R_3$ and $R_4$ are individually selected from linear or branched $C_n$ alkyl chains where n is an integer having a value of at least 4 and not more than 30, and wherein
[B⁻] is an anion of Formula II:

Formula II wherein $R_5$ is selected from hydrogen or a $C_1$-$C_6$ linear or branched alkyl group, and G can be hydrogen or a group of Formula III:

Formula III wherein
  $R_6$ is selected from hydrogen or a $C_1$-$C_6$ linear or branched alkyl group;
  $R_7$ can be a $C_1$-$C_6$ linear or branched alkyl group or an aromatic group, and
  when $R_5$ is hydrogen, $R_7$ may further also be attached to the nitrogen atom to which $R_5$ is attached, thereby forming a 4-7 membered ring together with said nitrogen.

Throughout the present application the following abbreviations will be used: [N4444]: tetrabutylammonium, [N6666]: tetrahexylammonium, [N66614]: trihexyltetradecylammonium, [Met]: L-Methionate, [Ile]: L-Isoleucinate, [Gly]: Glycinate, [Asn]: L-Asparaginate, [Tyr]: L-Tyrosinate, [Pro]: L-Prolinate.

In one embodiment $R_1$, $R_2$, $R_3$ and $R_4$ are alkyl chains of identical length.

In one embodiment $R_1$ is selected from butyl and hexyl, and $R_2$, $R_3$ and $R_4$ are individually selected from butyl and hexyl.

In another embodiment $R_1$ is a $C_n$ alkyl chain where n is an integer having a value of between 10 and 20, and $R_2$, $R_3$ and $R_4$ are alkyl chains of identical length selected from butyl, pentyl, hexyl, heptyl and octyl.

In a further embodiment $R_1$ is a $C_n$ alkyl chain where n is an integer having a value of between 10 and 20, and wherein $R_2$, $R_3$ and $R_4$ are individually selected from butyl, pentyl, hexyl, heptyl and octyl.

In one embodiment $R_7$ is selected from methyl, ethyl, 1-propyl, 2-propyl, 1-butyl, 2-butyl, t-butyl, 1-pentyl, 2-pentyl, 3-pentyl, 1-hexyl, 2-hexyl or 3-hexyl.

In another embodiment $R_7$ is an aromatic group selected from benzene, substituted phenyl groups and heteroaromatic groups such as imidazole, pyridine and indole.

In a further embodiment $R_7$ is an aromatic group selected from the following structures wherein the asterisk (*) denotes the attachment point

In preferred embodiments [A⁺] is an ammonium ion selected from tetrabutylammonium, tetrahexylammonium, and trihexyltetradecylammonium.

In one embodiment G is hydrogen, and [B⁻] becomes an anion of this structure:

wherein $R_5$ is selected from hydrogen or a $C_1$-$C_6$ linear or branched alkyl group.

In another embodiment G is a group of Formula III, and [B⁻] becomes an anion of this structure:

wherein
  $R_6$ is selected from hydrogen or a $C_1$-$C_6$ linear or branched alkyl group;
  $R_7$ can be a $C_1$-$C_6$ linear or branched alkyl group or an aromatic group, and
  the dotted line denotes that when $R_5$ is hydrogen, $R_7$ may be attached to the nitrogen atom to which $R_5$ is attached, thereby forming a 4-7 membered ring together with said nitrogen.

Figure 1:
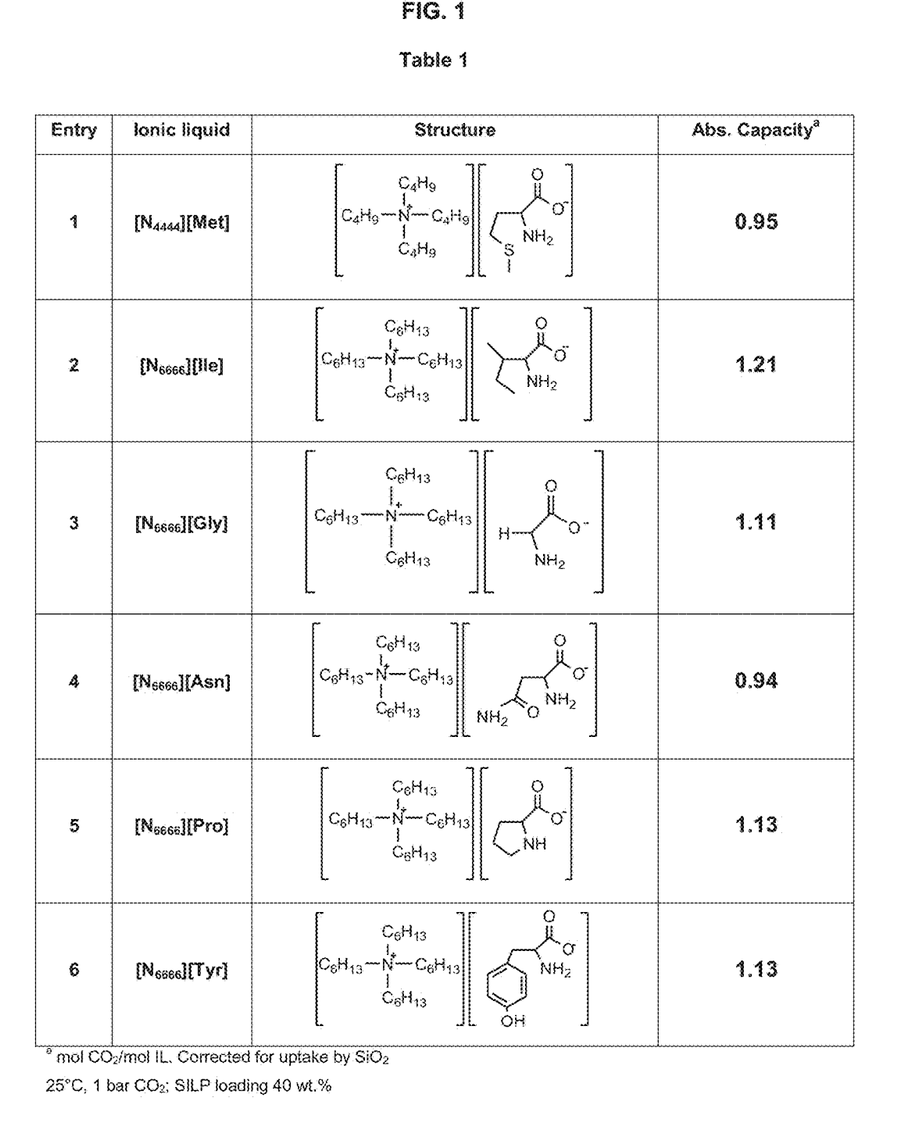
FIG. 1 shows Table 1: $CO_2$ absorption at room temperature and structure of ionic liquids.
Figure 2:
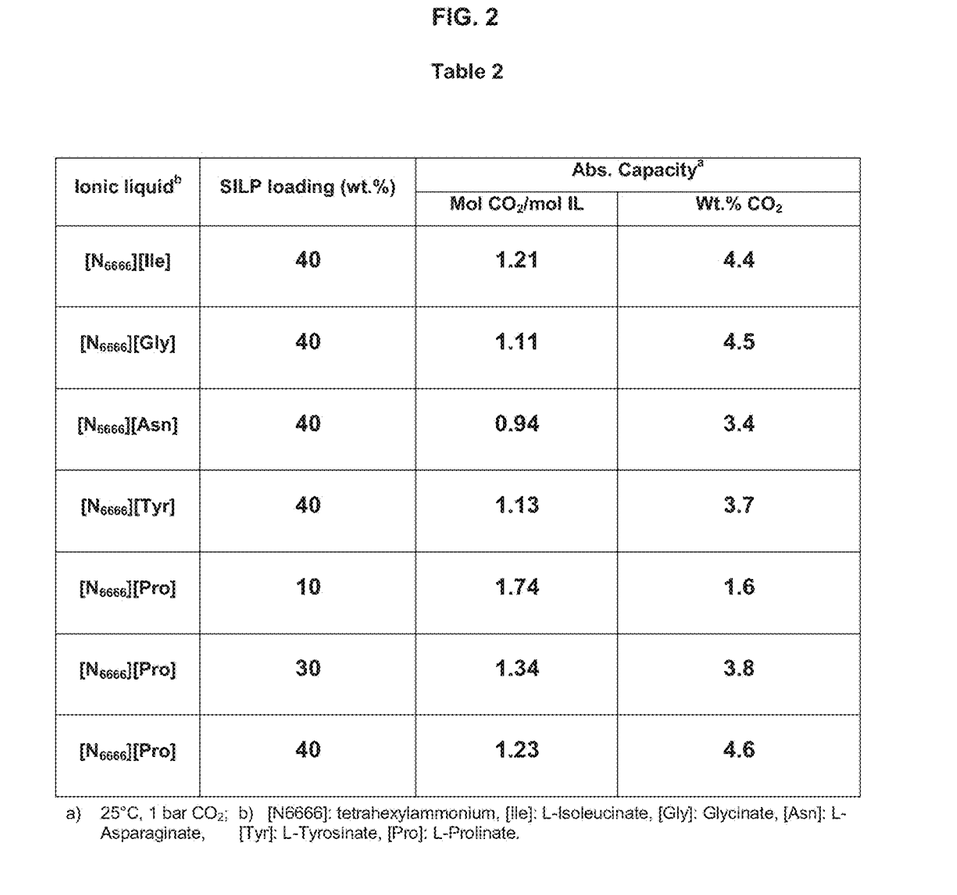
FIG. 2 shows Table 2: $CO_2$ absorption capacities for selected SILP absorbers

In a preferred embodiment $R_5$ is hydrogen, $R_6$ is selected from hydrogen or a $C_1$-$C_6$ linear or branched alkyl group and $R_7$ is an ethyl group further attached to the nitrogen atom to form a 5-membered ring, such that [B⁻] becomes an anion of this structure:

In another preferred embodiment $R_5$ is selected from hydrogen or a $C_1$-$C_6$ linear or branched alkyl group, $R_6$ is methyl and $R_7$ is an ethyl group, such that [B⁻] becomes an anion of this structure:

In further embodiments [B⁻] is an anion of one of the following amino acids:

Good to excellent absorption of $CO_2$ was observed for the following ionic compounds of the invention: [N4444][Met], [N6666][Ile], [N6666][Gly], [N6666][Asn], [N6666][Pro] and [N6666][Tyr], all impregnated on hydrophobic $SiO_2$ (Table 1 and 2).

In a preferred embodiment [B⁻] is thus an anion selected from L-Methionate, L-Isoleucinate, Glycinate, L-Asparaginate, L-Tyrosinate and L-Prolinate.

In a particularly preferred embodiment, [B⁻] is an anion selected from L-Isoleucinate, Glycinate and L-Prolinate.

In one preferred embodiment, [A⁺][B⁻] is [N6666][Ile].

In another preferred embodiment [A⁺][B⁻] is [N6666][Gly].

In a particularly preferred embodiment, [A⁺][B⁻] is [N6666][Pro].

In one preferred embodiment, [A⁺][B⁻] is [N66614][Pro].

In an embodiment the porous material is selected from porous (including mesoporous) inorganic, carbonaceous or a polymeric materials such as, but not limited to, silica, including mesoporous silica, controlled pore glass, alumina, titania (anatase), zirconia, alkaline earth metal oxides, clays and zeolites, or mixtures hereof.

In separate embodiments the porous material is selected from PG75-120 (mesh size 80-120, mean pore diameter 74 Å, pore distribution±7:0%, pore volume 0.47 cc/g, surface area 152.7 m²/g), PG500-80 (mesh size 20-80, mean pore diameter 547 Å, pore distribution±6:3%, pore volume 1.06 cc/g, surface area 44.5 m²/g), PG2000-200 (mesh size 120-200, mean pore diameter 1932 Å, pore distribution±7:3%, pore volume 0.86 cc/g, surface area 11.32 m²/g) and Silica gel 90 (mesh size 80-120, mean pore diameter 74 Å, pore distribution±7:0%, pore volume 0.47 cc/g, surface area 152.7 m²/g).

In an embodiment the composition according to the first aspect of the invention contains between 5-45% w/w of the ionic compound [A⁺][B⁻], such as 10% w/w, 20% w/w, 30% w/w or 40% w/w.

In another embodiment the composition according to the first aspect of the invention contains between 5-45% w/w, such as 10% w/w, 20% w/w, 30% w/w or 40% w/w, of an ionic compound selected from [N4444][Met], [N6666][Ile], [N6666][Gly], [N6666][Asn], [N6666][Pro] and [N6666][Tyr].

In yet another embodiment the composition according to the first aspect of the invention contains about 40% w/w of an ionic compound selected from [N6666][Ile], [N6666][Gly] and [N6666][Pro].

In specific embodiments, the composition of the first aspect has a total $CO_2$ absorption capacity of over about 1 mol $CO_2$/mol ionic liquid, such as over 0.9 mol $CO_2$/mol ionic liquid, over 1.1 mol $CO_2$/mol ionic liquid, over 1.2 mol $CO_2$/mol ionic liquid, over 1.3 mol $CO_2$/mol ionic liquid, over 1.4 mol $CO_2$/mol ionic liquid, over 1.5 mol $CO_2$/mol ionic liquid, over 1.6 mol $CO_2$/mol ionic liquid or over 1.7 mol $CO_2$/mol ionic liquid.

In other specific embodiments, the composition of the first aspect has a total $CO_2$ absorption capacity of over about 3% w/w $CO_2$, such as over 3.4% w/w $CO_2$, over 3.6% w/w, over 3.7% w/w, over 4.4% w/w, over 4.5% w/w or over 4.6% w/w.

In a second aspect the invention provides a method for absorption of gaseous $CO_2$ from a gas stream, which method comprises contacting said gas stream with a composition according to the first aspect of the invention.

In an embodiment the composition of the first aspect of the invention has an absorption capacity of over 1 mol $CO_2$/mol of the ionic compound [A⁺][B⁻] at a $CO_2$ concentration of less than 0.1 bar.

In a further embodiment the invention provides a method according to the second aspect of the invention, wherein the absorption takes place from a gas stream which contains 1-100 mol % $CO_2$ with an absorption capacity of over 1 mol $CO_2$/mol of the ionic compound [A⁺][B⁻].

In a particular embodiment, the contact between the gas stream and the absorbent composition of the invention takes place in a suitable reactor which could be a fixed-bed or movable-bed reactor using an appropriately shaped form of the composition of the invention to provide low resistance to the gas stream and thus an accompanying acceptable pressure drop across the reactor.

In particular embodiment, the gas stream is a flue-gas stream generated from combustion by large point stationary sources such as power plants.

In specific embodiments, the gas stream contains less than about 15% $CO_2$ such as 15% $CO_2$, 14% $CO_2$, 13% $CO_2$, 12% $CO_2$, 11% $CO_2$, 10% $CO_2$, 9% $CO_2$ or between 10-15% $CO_2$.

In a further particular embodiment, the gas stream contains significant amounts of water vapor, such as 3-5% $H_2O$, 5-7% $H_2O$, 7-10% $H_2O$, 10-12% $H_2O$, 12-14% $H_2O$ 14-16% $H_2O$ or more than 16% $H_2O$.

The compositions of the invention may be part of a composite material e.g. combined with fiber materials or other materials which improve the mechanical strength, but do not lower gas diffusion severely.

Reversible $CO_2$ absorption/desorption was further demonstrated at 80° C. without degradation of the supported ionic compound (also referred to in the following as the supported ionic liquid phase (SILP) material), and consecutive absorption-desorption cycles (desorption done at 80° C. for 2 h under argon flow) demonstrated complete desorption between each sorption cycle along with preservation of absorption capacities of around or above 1 mol $CO_2$/mol IL for the second and third cycle, respectively.

Consecutive absorption-desorption cycles for the 40 wt % [N6666][Pro] SILP absorber (desorption done at 80° C. for 2 h under argon flow) demonstrated further complete desorption between each sorption cycle, and preservation of good absorption capacities of 1.05 and 1.17 mol $CO_2$/mol IL for the second and third cycle, respectively (see table 4).

Figure 10A:
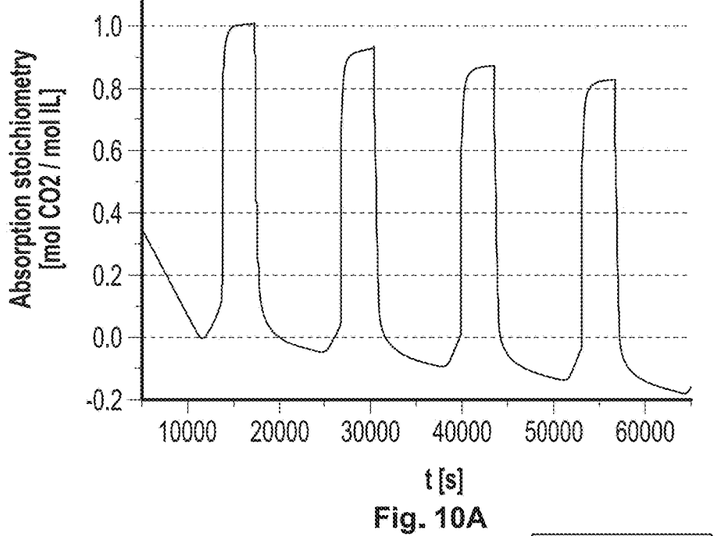
FIG. 10A shows successive recycling curves on one graph.
Figure 10B:
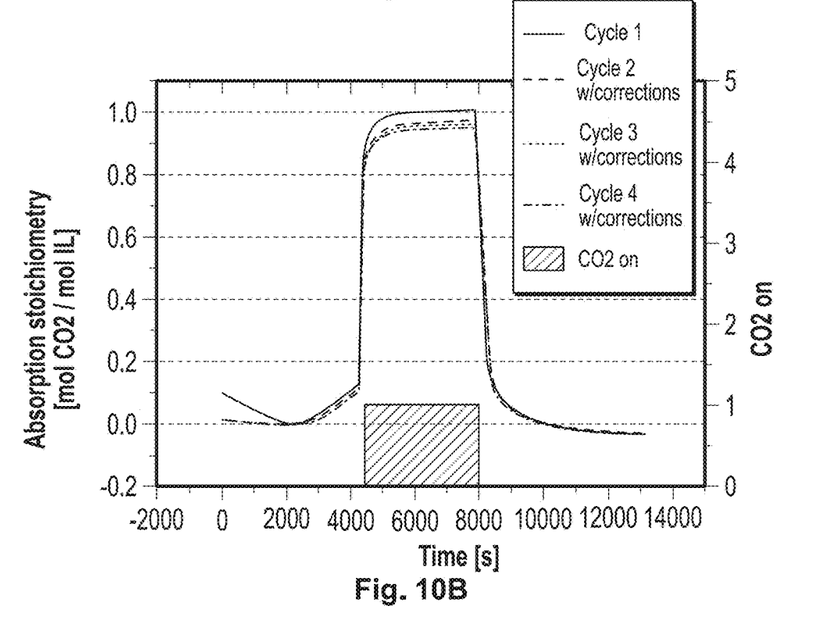
FIG. 10B shows all the cycles overlapped in one graph.

FIG. 10*a* shows recycling curves for [N6666][Gly] and FIG. 10*b* shows all the cycles shown in one graph. A very small loss of capacity is seen from the first to subsequent cycles. The absorption stoichiometry is around 1.00 mol of $CO_2$ per mol IL in this material. Absorption kinetics is very fast.

In a third aspect the invention also provides a method for desorption of the absorbed $CO_2$ by increasing the temperature of the saturated composition and/or decreasing the total pressure surrounding it and/or by flushing it with a gas stream with no or lower $CO_2$ content than the gas stream originally applied for the absorption.

Experimental

All chemicals were purchased from Sigma-Aldrich in p.a. quality and used as received. Glass, controlled pore series: PG75-120 (mesh size 80-120, mean pore diameter 74 Å, pore distribution±7:0%, pore volume 0.47 cc/g, surface area 152.7 m$^2$/g), PG500-80 (mesh size 20-80, mean pore diameter 547 Å, pore distribution±6:3%, pore volume 1.06 cc/g, surface area 44.5 m$^2$/g), PG2000-200 (mesh size 120-200, mean pore diameter 1932 Å, pore distribution±7:3%, pore volume 0.86 cc/g, surface area 11.32 m$^2$/g). Silica gel 90 (mesh size 80-120, mean pore diameter 74 Å, pore distribution±7:0%, pore volume 0.47 cc/g, surface area 152.7 m$^2$/g).

Silica gel 60 (Merck) was calcined at 600° C. for 6 h prior to use to obtain hydrophobic silica. All silica and SILP materials were stored in a desiccator over solid NaOH. $^1$H NMR spectra were recorded on a Varian Mercury 300 (300 MHz) and are reported relative to the residual solvent peak (δ=4.79 for $D_2O$ and δ=2.50 for $d_6$-DMSO). $^{13}$C NMR spectra were recorded on a Varian Mercury 300 (75.5 MHz) or a Varian Inova 500 (125 MHz) and are reported relative to the residual solvent peak (δ=39.52 for $d_6$-DMSO). FT-IR measurements were carried out with a Bruker ALPHA-P FT-IR spectro-photometer using an ATR platinum with diamond crystal. OPUS 6.5 software was used to analyze the samples. Spectra were taken with 24 scans unless otherwise stated. Structures of synthesized ionic liquids are given in Table 1.

TGA Analysis, General Procedure

Thermo gravimetric analysis (TGA) was performed on a Mettler Toledo TGA/DSC 1 STAR System with a Gas Controller GC 100 and a flow of nitrogen of 70 mL/min. A crucible was weighed inside the TGA instrument and approximately 10 mg of IL or 25 mg of SILP was transferred to it before reinsertion. The weight was noted and during measurements samples were heated from 40 to 600° C. at a constant heating rate of 10° C./min.

Figure 8:
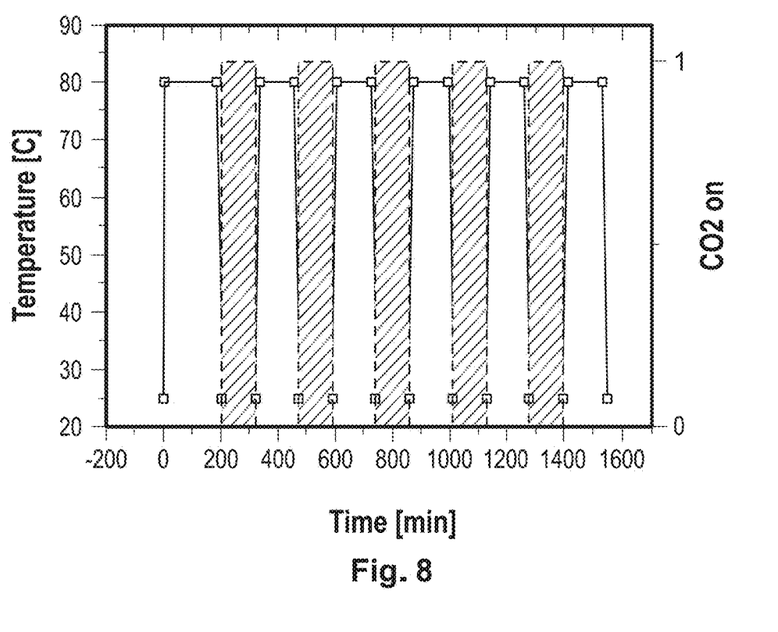
FIG. 8 shows Absorp 3.2 TGA program
Figure 9:
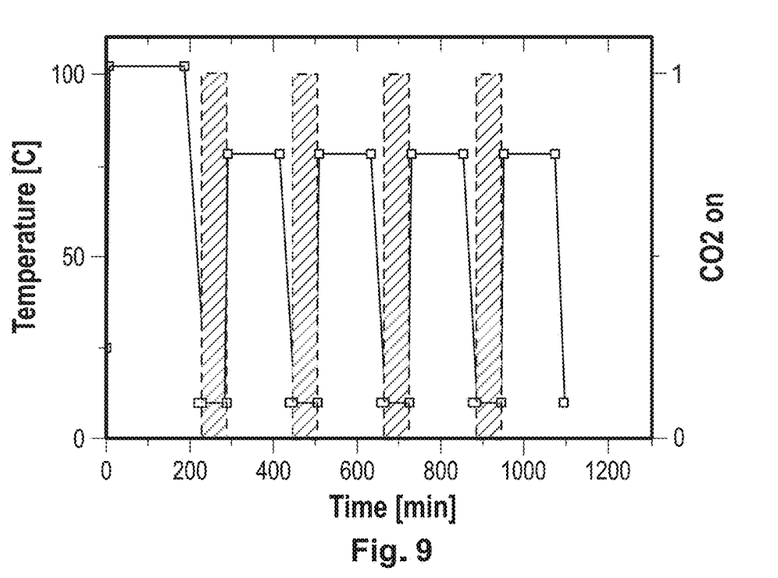
FIG. 9 shows Absorp 4.0 TGA program

Two ways of performing the TGA including recycling (flow absorption-desorption studies) are used in the present recycling studies. The two different TGA methods are illustrated graphically in FIG. 8 (Absorp 3.2) and FIG. 9 (Absorp 4.0). In the absorp 3.2 method the sample is heated to 80° C. in 180 min to remove remaining solvent followed by cooling to 25° C. with $CO_2$ absorption in 120 min, heating etc. In the absorp 4.0 method the initial heating is conducted at 100° C. and after the cooling to 25° C., the sample is left for 10 min under $N_2$ before $CO_2$ is lead over the sample (for 60 min), and intermediate heating steps are performed at 80° C. etc. In both methods the sample starts taking up $N_2$ during the cooling step. The same is seen with pure $SiO_2$ so a theory is that all the $N_2$ uptake stems from SiO2 $N_2$ uptake.

Synthesis of Tetrabutylammonium Methionate [N4444][Met]—Table 1, Entry 1

General procedure 1: 9.72 g of tetrabutylammonium hydroxide ([N4444][OH], 40 wt % in water, 15 mmol) was added to a 50 mL round-bottom flask along with a magnet stirrer. 2.45 g of L-methionine (16 mmol) was added and the edge of the flask was washed with 2 mL of water. The mixture was stirred overnight at rt to ensure full deprotonation of the amino acid. The magnet was removed and the water was evaporated at 10 mbar and 40° C. for 1 h. Excess amino acid was removed by adding 10 mL of cold acetonitrile. The flask was immersed into an icebath and allowed to precipitate for 1 h, followed by separation by a glass frit. The solvent was evaporated at 200 mbar and 40° C. for 1 h followed by 10 mbar and 40° C. for 1 h. $^1$H and $^{13}$C NMR spectra were taken in $D_2O$ and confirmed the identity of the ionic liquid. Purity of the IL was estimated by integration of visible impurities in the $^1$H NMR spectrum.

$^1$H NMR (500 MHz, $D_2O$) d=3.40 (dd, J=7.2, 5.6 Hz, 1H), 3.20 (m, 8H), 2.58 (t, J=7.8 Hz, 2H), 2.13 (s, 3H), 1.97 (m, 1H), 1.85 (m, 1H), 1.66 (m, 8H), 1.36 (m, 8H), 0.96 (t, J=7.4 Hz, 12H); $^{13}$C NMR (75 MHz, $D_2O$) d=181.85, 58.19, 55.43, 52.14, 34.29, 30.01, 23.29, 19.35, 14.41, 13.19; IR (ATR platinum diamond 1 Refl): 3359, 3285, 2960, 2935, 2874, 1584, 1487, 1464, 1380, 1326. Yield ≥99%. Purity ≥99% w/w.

Synthesis of Tetrahexylammonium Isoleucinate [N6666][Ile]—Entry 2

Following general procedure 1, tetrahexylammonium isoleucinate ([N6666][Ile]) was synthesised and its identity was confirmed by $^1$H and $^{13}$C NMR.

$^1$H NMR (300 MHz, $D_2O$) d=3.24-3.09 (m, 8H), 3.07 (d, J=5.3 Hz, 1H), 1.64 (br. s, 8H), 1.51-1.23 (m, 25H), 1.23-1.01 (m, 1H), 0.87 (m, 18H); $^{13}$C NMR (75 MHz, $D_2O$) d=181.57, 61.27, 58.21, 38.81, 30.92, 25.47, 24.41, 22.14, 21.31, 15.97, 13.77, 11.68; IR (ATR platinum diamond 1 Refl): 3381, 3288, 2955, 2926, 2860, 1583, 1487, 1465, 1379, 1327.

Yield ≥99%. Purity ≥99% w/w.

Synthesis of Tetrahexylammonium Glycinate [N6666][Gly]—Entry 3

Following general procedure 1, tetrahexylammonium glycinate ([N6666][Gly]) was synthesised and its identity was confirmed by $^1$H and $^{13}$C NMR.

$^1$H NMR (500 MHz, d$_6$-DMSO) d=3.69 (m, 8H), 2.66 (s, 2H), 1.57 (br. s, 8H), 1.29 (br. s, 24H), 0.88 (t, J=6.6 Hz, 12H); $^{13}$C NMR (75 MHz, d$_6$-DMSO) d=174.40, 57.58, 46.29, 30.60, 25.44, 21.89, 21.01, 13.69; IR (ATR platinum diamond 1 Refl): 3362, 3293, 2954, 2925, 2858, 1593, 1489, 1466, 1378, 1324.

Yield ≥99%. Purity ≥99% w/w.

Synthesis of Tetrahexylammonium Asparaginate [N6666][Asn]—Entry 4

Following general procedure 1, tetrahexylammonium asparaginate ([N6666][Asn]) was synthesised and its identity was confirmed by $^1$H and $^{13}$C NMR. $^1$H NMR (300 MHz, D$_2$O) d=3.56 (dd, J=9.1, 4.7 Hz, 1H), 3.17 (m, 8H), 2.65 (dd, J=14.8, 4.7 Hz, 1H), 2.40 (dd, J=14.8, 9.1 Hz, 1H), 1.64 (br. s, 8H), 1.32 (br. s, 24H), 0.87 (t, J=6.8 Hz, 12H); $^{13}$C NMR (75 MHz, D$_2$O) d=181.26, 176.79, 58.27, 53.44, 40.58, 30.54, 25.30, 21.85, 21.07, 13.36; IR (ATR platinum diamond 1 Refl): 3490, 3363, 3296, 3181, 2954, 2927, 2859, 1667, 1590, 1487, 1466, 1378.

Yield ≥99%. Purity ≥99% w/w.

Synthesis of Tetrahexylammonium Prolinate [N6666][Pro]—Entry 5

Following general procedure 1, tetrahexylammonium prolinate ([N6666][Pro]) was synthesised and its identity was confirmed by $^1$H and $^{13}$C NMR.

$^1$H NMR (300 MHz, D$_2$O) d=3.42 (dd, J=8.1, 6.1 Hz, 1H), 3.16 (m, 8H), 2.99 (m, 1H), 2.70 (m, 1H), 2.04 (m, 1H), 1.58 (m, 11H), 1.29 (br. s, 24H), 0.85 (t, J=6.7 Hz, 12H); $^{13}$C NMR (75 MHz, D$_2$O) d=182.05, 61.63, 58.27, 46.17, 42.99, 30.91, 30.66, 25.35, 21.96, 21.14, 13.53; IR (ATR platinum diamond 1 Refl): 3291, 2954, 2927, 2859, 1590, 1487, 1466, 1373.

Yield ≥99%. Purity ≥99% w/w.

Synthesis of Tetrahexylammonium Tyrosinate [N6666][Tyr]—Entry 6

Following general procedure 1, tetrahexylammonium tyrosinate ([N6666][Tyr]) was synthesised and its identity was confirmed by $^1$H and $^{13}$C NMR. However, for the precipitation of excess amino acid, 10 mL of cold MeOH was used instead of MeCN. This IL is sensitive to light and was therefore wrapped in aluminum foil during synthesis and storage.

$^1$H NMR (300 MHz, D$_2$O) d=6.99 (d, J=8.5 Hz, 1H), 6.61 (d, J=8.5 Hz, 1H), 3.40 (dd, J=7.6, 5.0 Hz, 1H), 3.11 (m, 8H), 2.87 (dd, J=13.6, 5.0 Hz, 1H), 2.66 (dd, J=13.8, 7.6 Hz, 1H), 1.61 (br. s, 8H), 1.30 (br. s, 24H), 0.81 (m, 12H); $^{13}$C NMR (75 MHz, d$_6$-DMSO) d=176.63, 160.67, 129.51, 126.61, 116.09, 58.45, 57.64, 42.28, 30.62, 25.46, 21.92, 21.01, 13.83; IR (ATR platinum diamond 1 Refl): 3233, 2954, 2926, 2859, 1589, 1513, 1486, 1466, 1380. Yield ≥99%. Purity ≥96% w/w.

Thermal Stability of SILP Absorbers

The ILs of particular interest according to the present invention are ones with a capability of capturing $CO_2$ from a dilute stream, such as off-gas from combustion, and concurrent release of the gas by temperature swing absorption (TSA). For this purpose the amino acid functionalized ILs according to the present invention and their corresponding SILP materials were synthesized and analyzed for temperature stability.

The temperature stability of the ILs was estimated by TGA, and the point of decomposition was determined by initial curvature of both the curve representing the weight as well as the heat flux to the sample. The points of decomposition for all the pure ILs were measured to be 140-150° C. except for [N6666][Tyr] which decomposed at approximately 130° C. After impregnation on $SiO_2$ (see below example) the resulting SILP materials showed comparable or slightly higher temperature stabilities vis-a-vis their IL counterparts, thus making them applicable for TSA.

Synthesis of Hydrophobic Silica.

Approximately 15 g of $SiO_2$ (marked Silica 60) was calcined at 600° C. for 6 h. The hydrophobic silica was stored in a desiccator over NaOH(s). This hydrophobic silica is used as a support material in the following.

Synthesis of Supported Ionic Liquid Phase Absorber Materials 2 g of [N6666][Met] was added to a 100 mL round-bottom flask along with a magnet stirrer. 10 mL of MeOH was added followed by 3 g of hydrophobic silica. The suspension was stirred overnight. The magnet was removed and the solvent was evaporated at 330 mbar and 40° C. for 1 h followed by 10 mbar and 40° C. for 1 h. The sticky solid was weighed and transferred to a glass fritted funnel and Ar was flowed through it for approximately three days at approximately 70 mL/min to remove remaining solvent. The dry SILP was transferred to a small container and stored in a desiccator over NaOH(s). All other examined SILP absorbers with 10-40 wt % IL loading were prepared by a similar method as described above (see Table 2).

The used carrier material, $SiO_2$, was chosen due to easy access and convenient calcination. It also has a high surface area and a mesoporous structure, both of which are important for a support material. Other support materials relevant in the context of the present invention include controlled pore glasses, alumina, titania (anatase), zirconia, alkaline earth metal oxides, clays and zeolites, or mixtures hereof.

$CO_2$ Absorption Studies $CO_2$ Absorption Capacities of the SILP Absorbers:

The equilibrium $CO_2$ absorption capacities of the SILP absorbers were determined under 1 bar of $CO_2$ pressure using the following method: A glass reactor was dried in an oven at 120° C. overnight, assembled hot, and allowed to cool for approximately 1 h. After weighing 1-2 g of SILP was transferred to the reactor where after it was degassed with helium (approximately 70 mL/min) for 24 h or until no further weight loss was observed. Subsequently, the reactor was subjected to a stream of approximately 50 mL/min of $CO_2$ gas (99.9%, Air Liquide Denmark) and the weight increase of the reactor followed periodically for 48 h. The absorption dynamics using a SILP absorber was demonstrated in a flow-setup at 0.09 bar $CO_2$ pressure (in He) using the following method: 0.78 g of a SILP absorber with 40 wt % [N6666][Pro] was loaded between glass wool into a glass tube reactor with inner diameter of 1 cm. The system was then purged with helium (50 mL/min) for approximately 30 min, where after a flow of $CO_2$ (5 mL/min) was directed into the helium stream and the $CO_2$ concentration at the reactor outlet was continuously measured using a $CO_2$ BINOS 100 detector (Rosemount Analytical, Solon, Ohio, USA). A blank experiment was also performed without absorber material in the reactor.

The absorption measurements revealed a number of the prepared amino acid-based SILP absorbers to provide excellent $CO_2$ uptake, as shown in Table 1 and Table 2. Hence, many of the SILP materials absorbed superstoichiometric amounts of $CO_2$, which is surprising considering the very slight physical solubility of $CO_2$ in ILs in general, and specifically at ambient pressure. All superstoichiometric uptake amounts are assigned to physical absorption (physisorption) as the ILs of the present invention are only able to bind one mol $CO_2$ by a chemical reaction with the amino group. Accordingly, the ILs of the invention very likely have accessible cavities for $CO_2$ to intercalate, possibly aided by attraction to the negatively charged carboxylate moiety present in the amino acid anions.

Figure 3A:
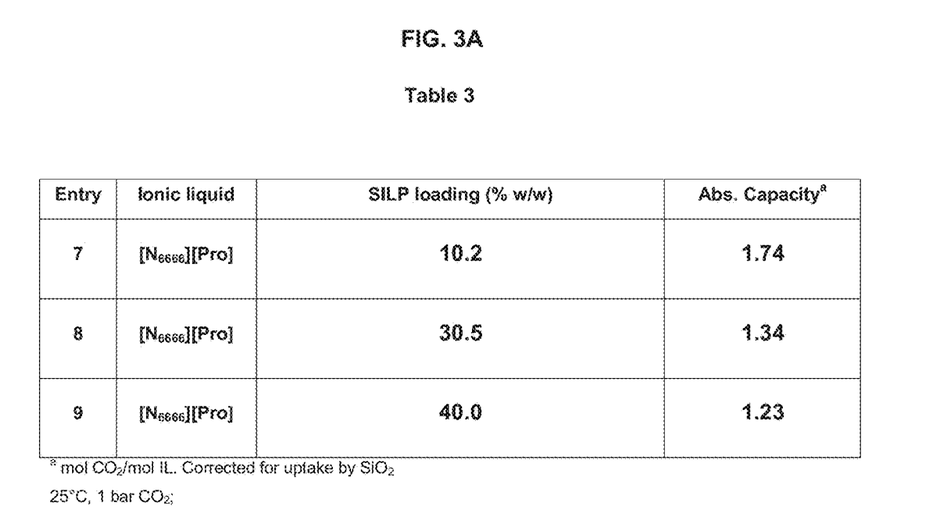
FIG. 3A shows Table 3: SILP loading and $CO_2$ absorption by a series of $[N_{6666}][Pro]$ materials

To determine if the superstoichiometric uptake had anything to do with the support porosity, specifically trapping of CO2 or IL in its pores, a series of lower loading SILP materials based on [N6666][Pro] was synthesised. After synthesis they were not characterised, only dried and submitted to CO2 absorption experiments (Table 3).

The SILP material with 10 wt % [N6666][Pro] loading showed a particular high equilibrium absorption capacity of 1.74 mol $CO_2$ mol IL (at 25° C., 1 bar $CO_2$). At higher loadings this ratio decreased gradually, as expected, indicating that the support affected the capacity although absorption by the $SiO_2$ was subtracted in the reported data. ILs have a high degree of ordering in the liquid state [[a]Jacquemin J, et al. High-pressure volumetric properties of imidazolium-based ionic liquids: Effect of the anion. *J Chem Engineer Data*, 2007, 52: 2204-2211; [b]Huang X et al. Why is the partial molar volume of CO2 so small when dissolved in a room temperature ionic liquid? *J. Am Chem Soc*, 2005, 127: 17842-17851], and this ordering might be further promoted by impregnation on a solid surface [[a]Gottfried J M et al., Surface studies on the ionic liquid 1-ethyl-3-methylimidazolium ethylsulfate using X-ray photoelectron spectroscopy (XPS). *Z für Physikalische Chem*, 2006, 220: 1439-1453; [b]Steinrück H-P. Recent developments in the study of ionic liquid interfaces using X-ray photoelectron spectroscopy and potential future directions. *Phys Chem Chem Phys*, 2012, 14: 5010-5029]. The surface-induced ordering of the IL would then extend some distance into the bulk liquid, and the effect is therefore more pronounced with low loading.

Figure 3B:
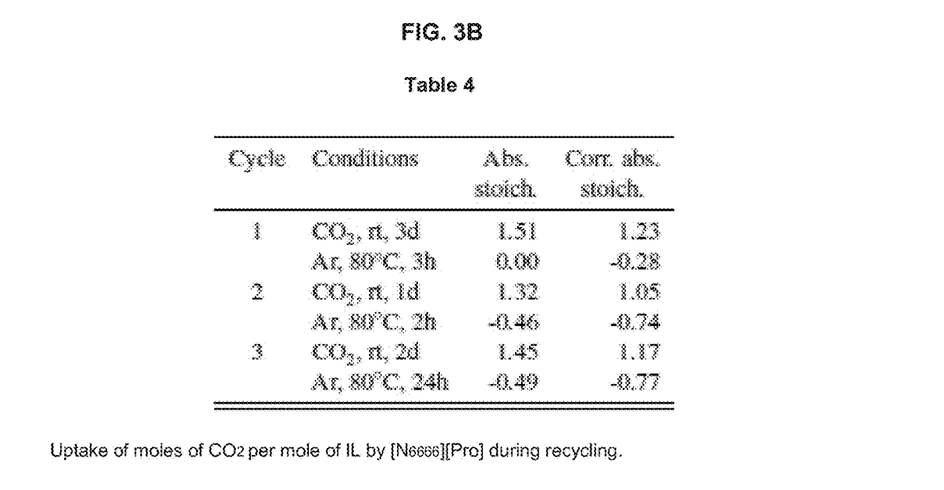
FIG. 3B shows Table 4: Recycling $CO_2$ absorption capacities for $[N_{6666}][Pro]$ SILP loading 40 wt %.
Figure 4:
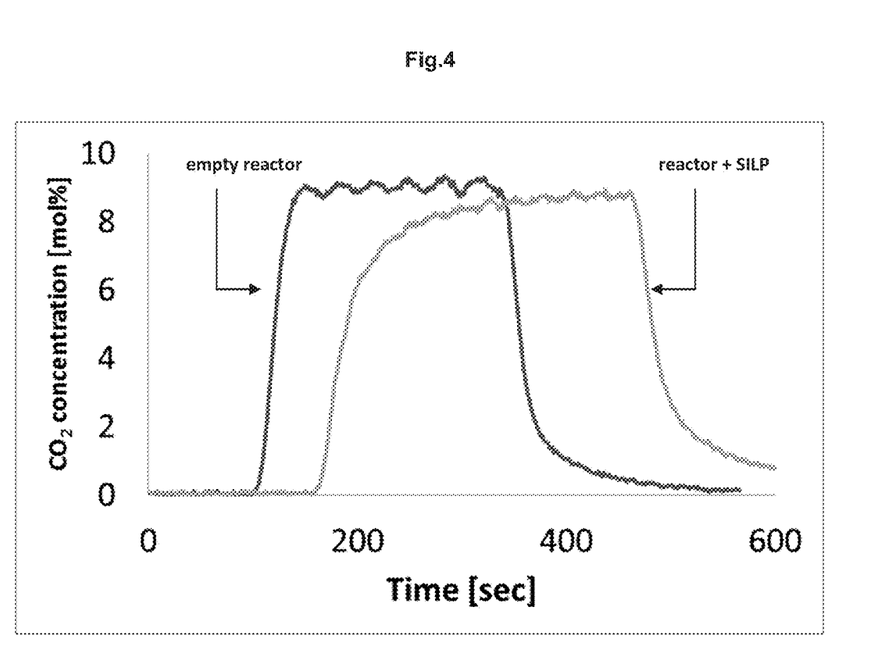
FIG. 4 Shows the difference in $CO_2$ outlet concentration in flow of empty reactor (left curve) and with 40 wt % [N6666][Pro] SILP absorber (right curve) at 25° C. and 0.09 bar $CO_2$/He and total gas flow of 55 mL/min.

To further assess the $CO_2$ absorption abilities of the SILP materials, flow absorption-desorption studies (recycle studies) were performed using the 40 wt % [N6666][Pro] SILP absorber, which possessed the highest $CO_2$ mass uptake, with a gas stream of 0.09 bar CO2 (i.e. 9 mol %) in He. The result showed that insertion of the amino acid-based SILP material into the $CO_2$-containing stream led to a fast $CO_2$ gas uptake and a "silent" time of approximately 50 sec before breakthrough compared to a blank run without absorber material, see FIG. 4. This corresponds roughly to utilization of one third of the SILP material's maximum gas uptake capacity. Consecutive absorption-desorption cycles for the 40 wt % [N6666][Pro] SILP absorber (desorption done at 80° C. for 2 h under argon flow) demonstrated further complete desorption between each sorption cycle, and preservation of good absorption capacities of 1.05 and 1.17 mol $CO_2$/mol IL for the second and third cycle, respectively (see table 4). For $CO_2$ uptake the last column should be examined, as it has been corrected for uptake of CO2 by SiO2, while for the desorption steps, the third column should be examined. This number has not been corrected for uptake of CO2 by the support material and will therefore be zero when the initial weight of the sample has been reached. As seen in table 4, the CO2 uptake becomes negative at the second and third desorptions. As the subsequent uptake of CO2 is superstoichiometric, this is probably not due to decomposition or evaporation of the active compound, but more likely to be desorption of solvent or moisture captured in the SILP material.

Figure 3C:
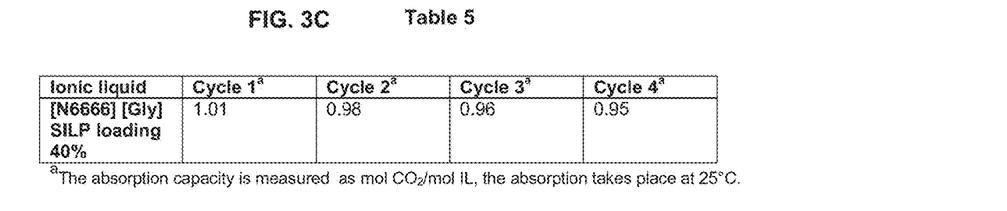
FIG. 3C shows Table 5: Recycling $CO_2$ absorption capacities for $[N_{6666}][Gly]$ SILP loading 40 wt %

Consecutive absorption-desorption cycles for the 40 wt % [N6666][Gly] SILP absorber (desorption done at 80° C. for 2 h under argon flow, see FIGS. 10a and 10b) demonstrated further complete desorption between each sorption cycle, and preservation of good absorption capacities for the second, third and fourth cycle, respectively (see table 5). A very small loss of capacity is seen from the first to subsequent cycles. The absorption stoichiometry is around 1.00 mol of $CO_2$ per mol IL in this material. Absorption kinetics is very fast.

The recycle studies conducted for, [N6666][Gly] can be seen in FIG. 10. FIG. 10a is raw data where the background is "drifting". This is probably due to evaporation of solvent.

The graphs are normalized so that the lowest point in the first cycle has the value 0 and the rest is calculated from there which means that the lowest point in the following cycles are below 0. FIG. 10b is corrected for this shifting, and is parallel displaced upwards so that all the cycle graphs begins in 0. The scale has been recalculated to a fraction of theoretically maximal $CO_2$ uptake by the SILP material.

These results clearly demonstrate the potential to use amino acid derived SILP absorbers for post-combustion $CO_2$ capture at relevant gas concentration levels by TSA operation.

FT-IR Analysis, General Procedure

A background spectrum was taken and sample was transferred to the ATR crystal to completely cover it. For liquid samples, a few drops were used, and for solid samples approximately 10 mg was used and pressed against the ATR crystal using the pressure arm. All spectra were recorded with 24 scans and corrected for background noise before analysis.

The active part for $CO_2$ absorption in the synthesized SILP materials is the amino acid anions. Thus, upon uptake of $CO_2$ some noteworthy changes in the IR spectrum of the anions are expected if carbamate formation occurs, as also previously shown by Brennecke et al. [Gurkan B E et al. Equimolar $CO_2$ absorption by anion-functionalized ionic liquids. *J Am Chem Soc*, 2010, 132: 2116-2117].

Figure 5:
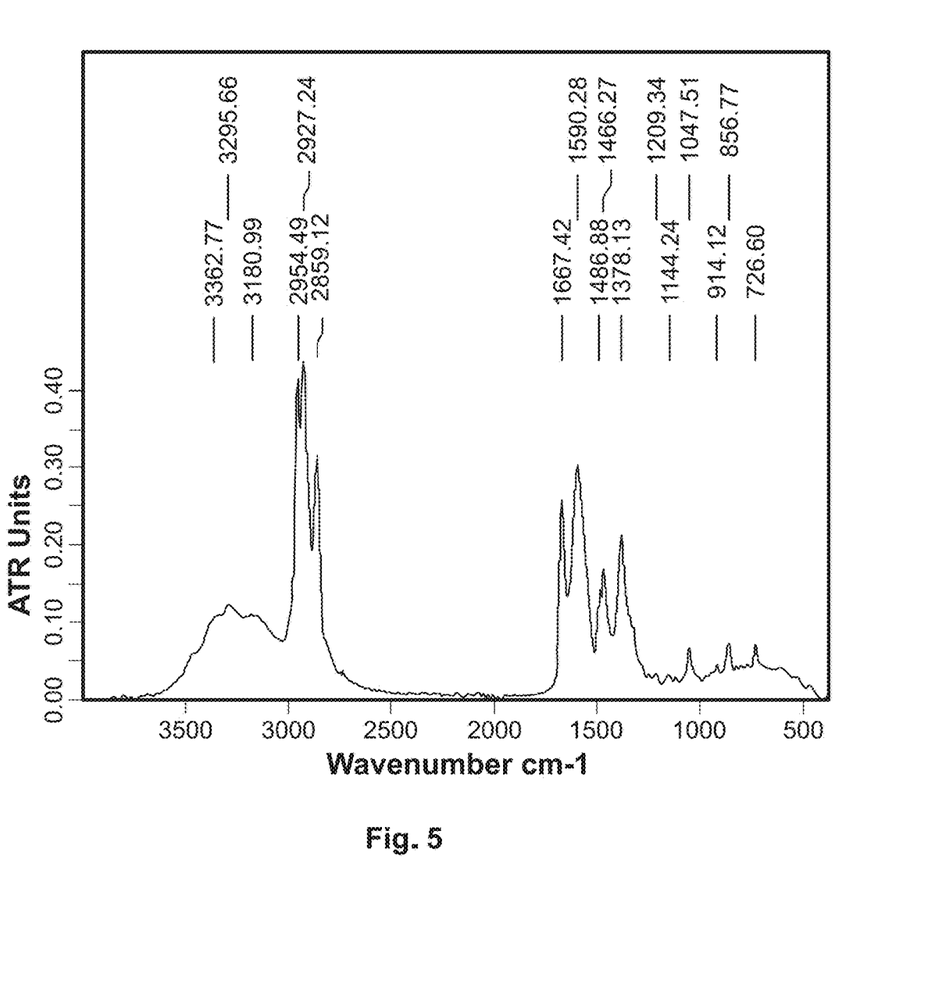
FIG. 5 Shows an FT-IR spectrum of [N6666][Asn] as the neat ionic liquid.
Figure 6:
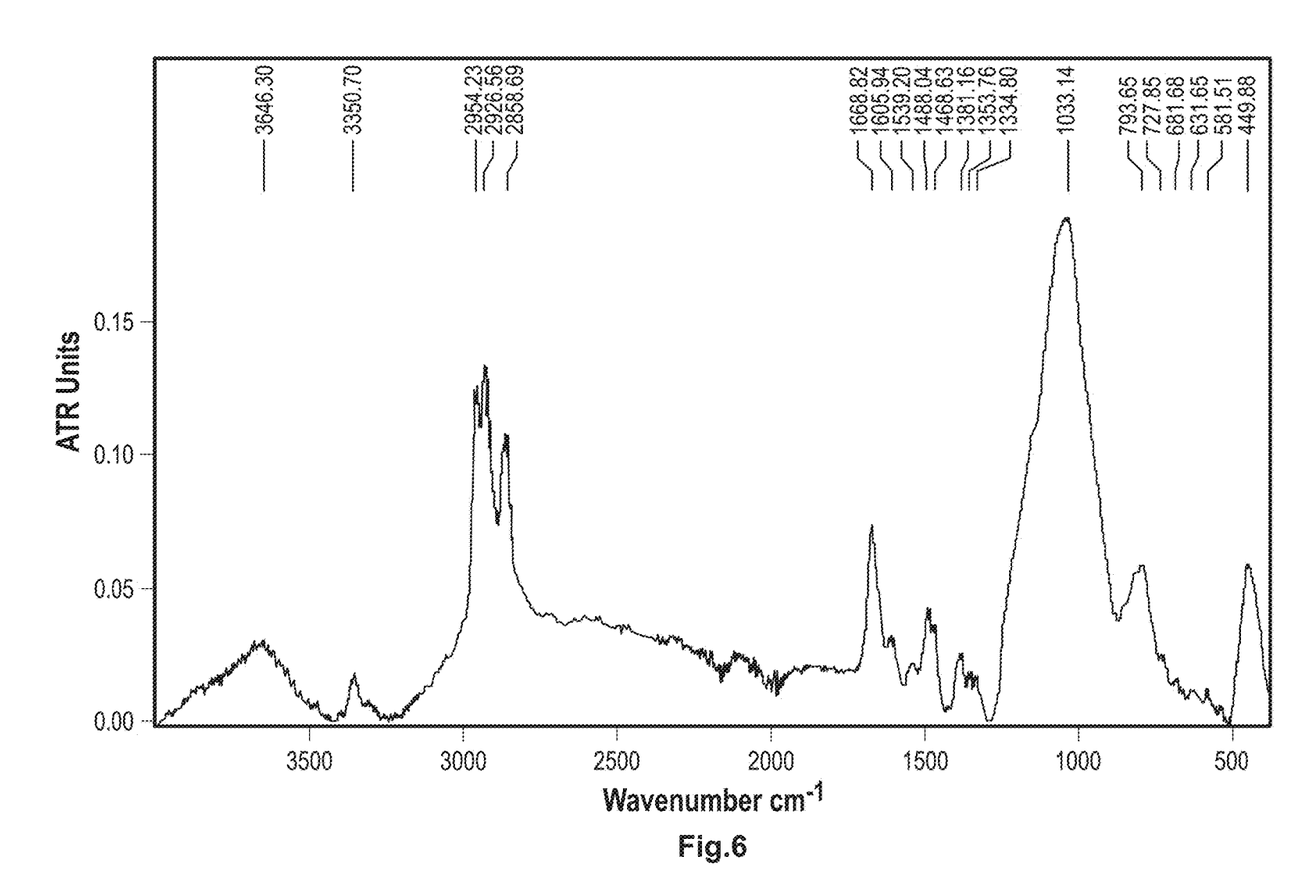
FIG. 6 Shows an FT-IR spectrum of [N6666][Asn] as the SILP version.
Figure 7:
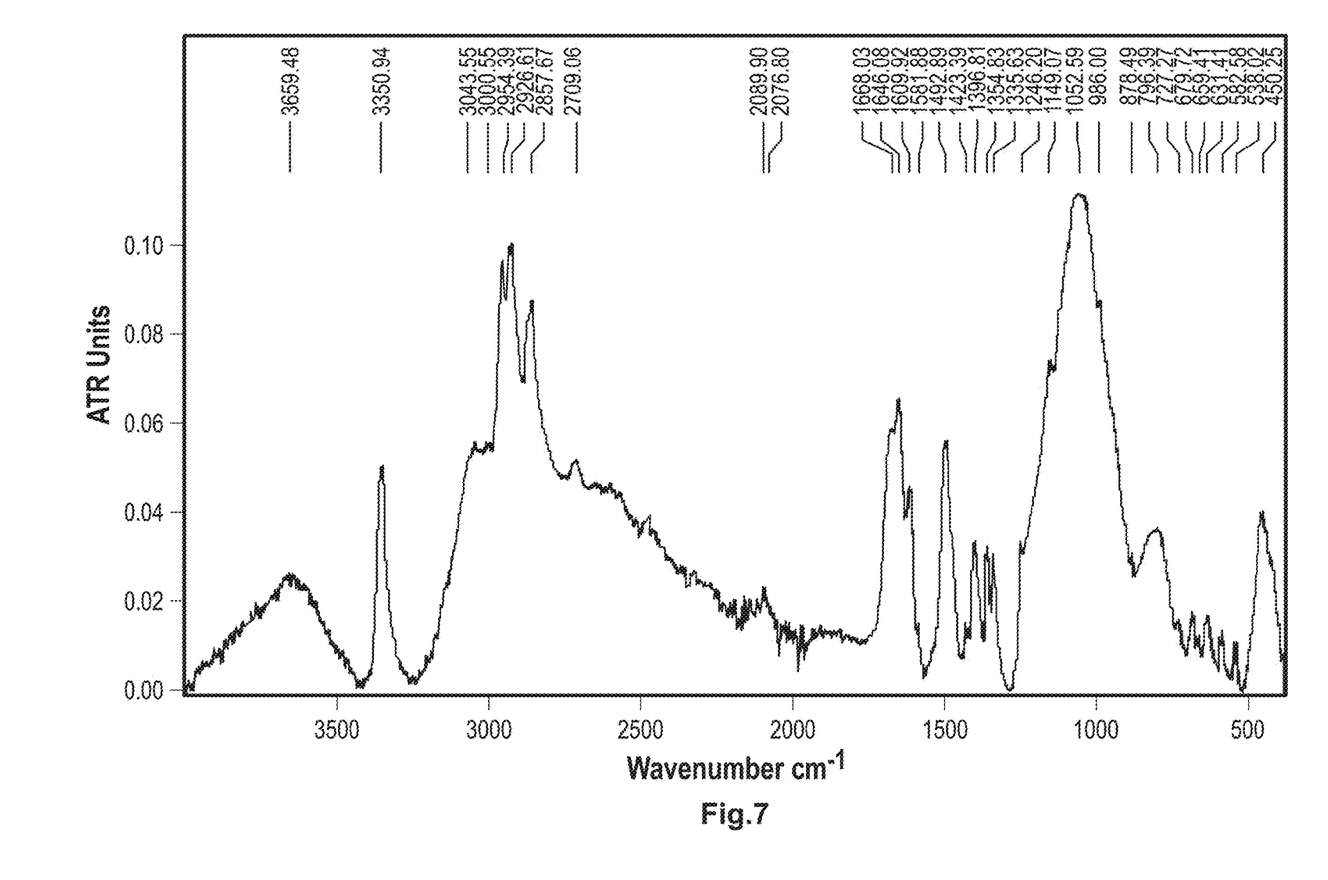
FIG. 7 Shows an FT-IR spectrum of [N6666][Asn] as the SILP version after $CO_2$ absorption.

In all the FT-IR spectra of the SILP materials before and after $CO_2$ absorption, significant changes in both the N—H stretching region and/or the 1700-1300 $cm^{-1}$ region were observed (see exemplary FIG. 5-7 for [N6666][Asn]). This leads to the conclusion that $CO_2$ indeed was chemically absorbed up to 1 mol $CO_2$ per mol IL via the nitrogen moiety of the amino acid anions in the SILP materials, as expected.

FIG. 5-7 were recorded for [N6666][Asn] and SILP versions thereof. For the neat IL [N6666][Asn] itself four N—H stretch bands are seen in the spectrum, while only two poorly resolved bands are seen in the SILP spectrum. After $CO_2$ absorption, one of these bands has become strong. The 1700-1300 $cm^{-1}$ region also shows clear signs of chemical uptake of $CO_2$ with the appearance of a C=O stretch at 1646 $cm^{-1}$ and a band at 1581 $cm^{-1}$ that might come from a now visible N—H bending motion.

What is claimed:
1. A method for absorption of gaseous $CO_2$ from a gas stream and desorption of the absorbed $CO_2$, which method comprises contacting said gas stream with a composition at ambient temperature and pressure, wherein the composition comprises:
an ionic compound [A⁺][B⁻] supported on a porous material, wherein
[A⁺] is an ammonium ion ([N6666]) of Formula I

Formula I wherein $R_1$, $R_2$, $R_3$ and $R_4$ are linear $C_6$ alkyl chains, and

[B⁻] is an anion selected from the group consisting of L-Isoleucinate ([Ile]), Glycinate ([Gly]), L-Tyrosinate ([Tyr]) and L-Prolinate ([Pro]), and desorbing the $CO_2$ absorbed on the composition by temperature swing absorption (TSA), by increasing the temperature of the composition, by decreasing the total pressure surrounding it, and/or by flushing it with a gas stream with no or lower $CO_2$ content than the gas stream originally applied for the absorption.

2. The method according to claim 1, wherein the composition contains 40% w/w of an ionic compound selected from the group consisting of [N6666][Ile], [N6666][Gly] and [N6666][Pro].

3. The method according to claim 1, wherein the absorption takes place from a gas stream which contains 1-100 mol % $CO_2$ with an absorption capacity of over 1 mol $CO_2$/mol of the ionic compound [A⁺][B⁻].

4. The method according to claim 1, wherein the gas stream is a flue-gas stream generated from combustion by large point stationary sources.

5. The method according to claim 4, wherein the large point stationary sources are power plants.

6. The method according to claim 1, wherein the contact between the gas stream and the composition takes place in a fixed-bed or movable-bed reactor.

7. The method according to claim 1, wherein the anion is selected from the group consisting of L-Isoleucinate ([Ile]), Glycinate ([Gly]) and L-Prolinate ([Pro]).

8. The method according to claim 1, wherein the porous material is selected from the group consisting of porous (including mesoporous) inorganic, carbonaceous or polymeric materials.

9. The method according to claim 8, wherein the porous material is selected from the group consisting of silica, hydrophobic mesoporous silica, controlled pore glass, alumina, titania (anatase), zirconia, alkaline earth metal oxides, clays and zeolites, or mixtures hereof.

10. The method according to claim 1, wherein the composition contains between 5-45 w/w of the ionic compound [A⁺][B⁻].

11. The method according to claim 10, wherein the composition contains 10% w/w of the ionic compound [A⁺][B].

12. The method according to claim 10, wherein the composition contains 20% w/w of the ionic compound [A⁺][B⁻].

13. The method according to claim 10, wherein the composition contains 30% w/w of the ionic compound [A⁺][B⁻].

14. The method according to claim 10, wherein the composition contains 40% w/w of the ionic compound [A⁺][B⁻].

* * * * *